United States Patent [19]

Dannelly

[11] 4,249,343
[45] Feb. 10, 1981

[54] SEED COATINGS

[75] Inventor: Clarence C. Dannelly, Kingsport, Tenn.

[73] Assignee: Eastman Kodak Company, Rochester, N.Y.

[21] Appl. No.: 60,547

[22] Filed: Jul. 25, 1979

[51] Int. Cl.³ ............................................. A01C 1/06
[52] U.S. Cl. .............................. 47/57.6; 260/32.6 N
[58] Field of Search .................. 47/57.6, 58, DIG. 9; 260/32.6 N

[56] References Cited

U.S. PATENT DOCUMENTS

| 3,707,807 | 1/1973 | Graves | 47/57.6 |
| 3,905,152 | 9/1975 | Loperfido | 47/57.6 |
| 3,947,996 | 4/1976 | Watts | 47/57.6 |
| 3,950,891 | 4/1976 | Hinkes | 47/57.6 |

FOREIGN PATENT DOCUMENTS

2731203  1/1979  Fed. Rep. of Germany ............ 47/57.6

Primary Examiner—Robert E. Bagwill
Attorney, Agent, or Firm—John F. Stevens; Daniel B. Reece, III

[57] ABSTRACT

Compositions are disclosed comprising a water insoluble microgel which when used as a coating for seeds provides protection for the seeds and may be used as a carrier for materials such as fertilizers, herbicides, pesticides, etc. The microgel does not dissolve when contacted with water, but the outer layer of the microgel swells and falls away, thereby disrupting the coating, and continues until the coating is removed. An advantage of such a coating is that there is no dissolved material available to fill the pores of the seeds to thereby retard germination. The coating quickly disintegrates upon contact with water for releasing any carried substances and exposing the seeds to their natural environment.

13 Claims, 5 Drawing Figures

SEED COATINGS

BACKGROUND OF THE INVENTION

1. Field of the Invention

This invention relates to coating plant seeds with a functional material which disintegrates after becoming wet to allow normal germination of the seeds.

2. Description of the Prior Art

It is known in the art to coat seeds with a functional material to provide protection against mechanical or environmental damage, and to use such coatings as a carrier for various materials such as, for example, fertilizer, pesticide, herbicide, etc. Such coatings have generally been of a water soluble material, so that the coating would dissolve to allow exposure of the seeds to the atmosphere for development. Such water soluble materials include water soluble polymers. Specifically U.S. Pat. No. 2,651,883 relates to use of polymeric water soluble polyelectrolytes as seed coatings. U.S. Pat. Nos. 3,707,807 and 3,598,565 relate to use of water soluble neutralized copolymer of an $\alpha,\beta$-unsaturated monocarboylic acid and a lower alkyl acrylate and a crosslinked copolymer of vinyl acetate and a lower alkyl acrylate. In contrast, U.S. Pat. No. 3,316,676 relates to a water insoluble seed coating, the integrity of which is destroyed by shrinkage due to contact with water. U.S. Pat. No. 3,905,152 relates to seeds having a coating thereon comprising non-porous, hydrophobic, non-phytotoxic particles which are adhered to each other and to the seed by means of a hydrophilic binder in such a manner that the coating is highly porous and provides facile gas and water exchange between the seed and the environment.

SUMMARY OF THE INVENTION

According to this invention, compositions for coating plant seeds are provided comprising a water insoluble microgel. The microgel is functional in that is provides protection for the seeds from mechanical and environmental damages and may be used as a carrier for materials such as fertilizers, herbicide, pesticides, etc. An important feature, however, is the fact that the microgel does not dissolve when contacted with water. Instead, the outer layer of the microgel swells and falls away dissrupting the coating, and the swelling and falling away continues until the coating is removed. An advantage of such a coating is that there is no dissolved material available to fill the pores of the seeds to thereby retard germination. The coating quickly disintegrates upon contact with water for releasing any carried substances and expose the seeds to their natural environment.

BRIEF DESCRIPTION OF THE DRAWINGS

The drawings illustrate a preferred method and apparatus for coating seeds in accordance with this invention. In the drawings.

DETAILED DESCRIPTION OF THE INVENTION

According to the present invention, plant seeds (e.g., vegetable, crop, flower) are coated with a water-sensitive polymeric microgel such as that described in detail in U.S. Pat. No. 2,908,659. By a microgel is meant a unimolecular colloidal particle of a cross-linked polymer having on the average a diameter of from about 0.01 micron to no greater than about 3 microns cross linked to such an extent that it forms a "microsol," as defined hereinafter, when extended in liquids in which it is swellable, and exhibits therein a characteristic defined as a "gel point" which will be described in detail hereinafter. The transition from the soluble to the insoluble form proceeds gradually in a direct relation to the degree of cross-linking. As solubility decreases, characteristic swellability is observed. Swellability diminishes as cross-linking is increased. The art denotes the insoluble form as cross-linked. The recognition of the liquids in which a particular cross-linked polymer is swellable will be obvious to those skilled in the art. In general, where the product is formed from a linear polymer by cross-linking, it is swellable in those liquids in which such linear component exhibits solubility. Where no identifiable linear counterpart exists, swellability follows analogously the recognized laws applicable to the solubility of linear polymers.

The microgel particle is a cross-linked polymer, i.e., it is swellable in certain liquids, but does not dissolve therein in the accepted sense of the term. Because of its particle size limitations it possesses unique properties when extended in a medium in which it is swellable. When a microgel is distributed in an extending medium, the product will be referred to as a "microsol."

A microsol partakes of some of the properties of both true dispersions and true solutions. The particles exhibit Brownian motion. The microsols do not follow Staudinger's law, which relates viscosity to molecular weight. Microsol viscosities have been observed to have no relation whatever to the molecular weight of the microgel. On evaporation of the extending medium, the microgel particle, in its original discrete form, is recovered. The microsols possess a "gel-point", i.e., a concentration of a given microgel particle in a given extending medium at which the extending medium is absorbed by the microgel particles. Below the gel point the microgel particles have no appreciable effect upon the viscosity of the extending medium. At and above the gel point, a sharp increase in viscosity with increase in microgel concentration is observed. The gel point will vary for any particular system, but it can be readily determined empirically by plotting the percent concentration by weight of microgel against the viscosity of the microsol.

Among the useful water sensitive monomers for the production of microgels by addition polymerization include acrylic acid; methacrylic acid; hydroxy esters, amino substituted esters and amides of acrylic acid, methacrylic acid and maleic acid; vinylpyridine and derivatives of vinyl pyridine such as 2-methyl-5-vinyl-pyridine.

Also of value to the practice of the invention are polymers which are made to have the structure of a microgel by virtue of chemical reaction such as cross-linked polyvinyl acetate obtained as a latex wherein the latex is hydrolyzed by reaction of a strong base such as sodium hydroxide to obtain a gel comprised of cross-linked polyvinyl alcohol and cross-linked polyethyl acrylate latex reacted with strong base to obtain a polyacrylic acid sodium salt microgel.

Appropriate cross-linking agents are chosen in accordance with conventional practice in the production of cross-linked polymers. Compounds useful in this function include those which contain two or more times the vinyl or acrylic grouping, as for instance, divinyl benzene, diallyl cyanamide, ethylene diacrylate, methylene diacrylamide, ethylene glycol divinyl ether, triethylene, dimethacrylate, vinyl acrylate and glycerol trivinyl ether.

In addition to the emulsion technique, the cross-linking reaction may also be carried out by subjecting an emulsion of a solution of the linear polymer in the presence of a cross-linking agent to polymerization conditions. In such a process, the cross-linking agent may act as the solvent for the linear polymer, or the linear polymer may be dissolved together with the cross-linking agent in an inert solvent.

The appropriate catalyst, dispersing agent and dispersion medium for any particular microgel formation is chosen in accordance with conventional practice in addition polymerization by the dispersion technique. The dispersed phase must be maintained fine enough usually by a combination of dispersing agent, agitation, and reaction period, to maintain the average size of the formed microgel particle to less than 3 microns in diameter.

Microgels useful in accordance with the present invention may also be formed by condensation. In such processes they are preferably produced by a modified emulsion technique. In this process, each reactant is dissolved in a different solvent, the solvents being of such character they they are immiscible, i.e., one may be polar and the other nonpolar. The solvents must be liquid at reaction temperature. An emulsion of the incompatible solvents is formed, preferably in the presence of a dispersing agent. On addition of the continuous phase reactant (i.e., the reactant soluble in the continuous phase) and the discontinuous phase reactant to the emulsion of incompatible solvents (referred to hereinafter as a reactant contact medium), polymerization by condensation occurs at the emulsion interface. The product may thereafter form a microsol in one phase or the other at alternately being non-swellable in either phase, precipitate out or form a dispersion as a microgel. Where required, a cross-linking agent may be incorporated in either or both phases. A stabilizing agent is advantageously employed in either or both phases where formation of the polymer occurs as a minute dispersion and precipitation is not desired. A condensing agent to remove products formed during reaction may also be present to assist polymer formation.

It is preferred that the microgels have a gel point of from about 15 to about 35%. This corresponds to a swellability of 500 to 300%. The lower limit of cross-linking will vary widely in terms of gel point and swellability factor, depending on the nature of the particle. The extent of cross-linking can be controlled by conventional reaction modifications such as variation of the proportion of reactants, choice of catalyst, polymerization period, reaction temperature and the like.

The degree of crosslinking is sufficient to limit the degree of hydration but does not preclude the formation of films from suspensions of the solvated microgel. A microgel has sufficient crosslinkages between linear chains so that the solvated particle can only interact with other like particles by limited entanglement of molecular chain segments located at the periphery of the particles. A characteristics of such particles is that the particle can only absorb limited solvating substances before cohesive forces between particles are destroyed. It is this characteristic which is utilized in the practice of this invention. A seed coated with a soluble polymer germinates more slowly than an uncoated seed. Both the permeation and the removal of a soluble polymer require sufficient solvating liquid to mobilize outer layers of polymer as well as liquid to solvate remaining layers. It is well known that the water vapor permeability of a hydratable polymer is a direct function of hydration of the film. The amount of water necessary to both remove a water-soluble seed coating and provide water for the seed's germination processes is much greater than that for an uncoated seed.

The response of a crosslinked water-sensitive microgel to water is different than that of a soluble polymer. In the case of a film or coating composed of cohesively bonded microgels, the first action of the water is to swell the microgel particles to the solvation limits which are much less than for soluble polymers. These swollen microgels then tend to separate from the mass of the coating by ablative-like mechanisms, thereby rapidly exposing new regions of the film to the errosive effects of water. The film composed of microgels also tends to fracture as it is swollen by hydrating water to the extent that the film essentially loses all barrier properties. This fracturing exposes the seed to the water source and the natural swelling response of the seed further disrupts the film. The net effect of coating a seed with a film composed of cohesively bonded crosslinked microgels is that on contact with water, the total retardation of the natural response of a viable seed to water is so slight that it is not observable from natural variation in a lot of seeds. If the microgel is composed of a polymeric substance more hygroscopic than the layer on the seed known as the natural seed coat, the overall germination of the seed is accelerated when compared to an uncoated seed.

In the practice of the invention, a microgel derived from natural polymers or from synthetic polymers may be further modified or contain additives which render a film formed in contact with a viable seed hygroscopic. Inclusion and/or attachment of hygroscopic moieties such as glycerol, hygroscopic inorganic salts such as sodium sulphate are therefore useful in some instances.

A very important practice of the invention is the employment of the film composed of or containing significant proportion of microgels as a carrier for various agrichemicals of benefit to the life stored in a viable seed or to the emergent seedling or even to the resulting plant. The additive substances include fungicides and antibacterial agents to protect the seed during storage and fungicides and antibacterial agents to assist the seedling plant in combatting the soil borne pathogens. Also included are the use of plant hormones beneficial to the seed or seedlings as well as plant growth regulators. Many such substances are known to the art of agronomy and more are being identified.

The incorporation of such desirable substances may be by direct addition to the microgel as it is being used to coat the seed or they may be separately combined with small particulate articles of manufacture such as microcapsules containing a discrete wall and core, microencapsulated by inclusion in a finely divided polymeric matrix or microencapsulated by inclusion in the voids of an inorganic substance such as aggregates of clay or the lattice of an expandable mineral such as vermiculite.

The polymeric substances attached to or surrounding the seed may be composed of multiple layers of microgels of different composition or one or more different microgels in combination with one or more soluble polymers.

The polymeric substances comprise microgels and in some instances soluble polymers may be modified with pigments, fillers, and/or plasticizing substances as is well known to the art of compounding polymeric substances. The films can be formed on the surface of the seeds by spraying using atomized solutions of well known solvents for the particular polymer or melts, by contacting the seeds simultaneously with powders and solvents or adhesives, or by polymer forming techniques such as are well known to the pharmaceutical dosage forming art. Normally, the coating thickness will be between about 0.5 and 10 mils, or a coating weight of about 0.25–5%, based on the weight of the coated seed.

A preferred method and apparatus for coating the seeds is illustrated in the drawings.

The apparatus employs a truncated hollow cone in which the slope or pitch of the walls is such that the seeds are accelerated at an increasing rate and not just at a rate so as to maintain the gas velocity at any given point in the cone at a level greater than that necessary to move the particles in a continuous upward direction. The significance of the slope or pitch of the truncated hollow cone of the invention is that when a particles first enters the cone at one rate of speed, it is then accelerated to a different rate of speed and continues to be accelerated to still different rates of speed as it moves upwardly through the cone. In this manner a separation is brought about between the particles so that after they are coated they may become sufficiently dry before coming into contact with other particles and thereby avoid undesirable clumping or agglomerating together. The pitch of slope is such as to cause a compression of the gas molecules and thereby cause the acceleration at an increasing rate.

In reference to FIG. 1, the coating apparatus is designated in general at 10 and includes a vertically disposed first hollow column 12 of regular shape. By "regular shape" is meant that it may be cylindrical, octagonal, hexagonal or of other configurations, so long as the hollow column is generally symmetrical with respect to its central axis. The hollow column contains therewithin the particle storage, coating, drying and deceleration zones, which will be described herein.

A truncated hollow cone 14, which may also be a tapered octagon or other tapered polygonal configuration, in other words, generally cone-shaped configurations, serving as an enclosure in which the upwardly flowing gases are received, compressed and accelerated, is centrally disposed within the first hollow column, has a uniformly decreasing cross-section in the upward direction and is of predetermined height dependent upon the size and weight of the seeds to be treated. Within the truncated hollow cone in ascending order are the coating and drying zones. The cone serves also to separate the coating and drying zones from the deceleration zone, which lies in the region above the upper end of the cone, and from the storage zone, which lies therebetween the cone and the interior wall surface of the first hollow column.

The first hollow column 12 is provided at its lower end with an inwardly tapered base 16. The lower end of the truncated hollow cone is spaced radially inwardly from the inwardly tapered base.

A second vertically disposed hollow column 18 of regular shape is connected to the inwardly tapered base of the lower end of the first hollow column, the wall surface of the inwardly tapered base forms a juncture with the wall surface of the second hollow column.

Disposed within the second hollow column is a first plenum chamber 20 into which a suitable compressed gas, such as air, may be provided through two or more opposed inlets 22, 24; a gas or air collimating plate 26; a second plenum chamber 28 separated from the first plenum chamber 20 by the collimating plate 26; at least one gas shaping or aerodynamic structure 30 disposed within the second plenum chamber; and a seed support or supporting screen 32, which extends across the second hollow column and is located above the aerodynamic structure.

The gas or air collimating plate 26 is a perforated plate which causes the gas or air in the first plenum chamber to pass into the second plenum chamber in an essentially vertical and uniform flow, as illustrated by the vertical arrows.

The gas shaping or aerodynamic structure 30 in cooperation with the adjacent wall surface of the second hollow column, compresses and focuses the upwardly moving gas or air flow so that it flows over a portion of the surface of the aerodynamic structure, upwardly through the particle support screen and into the entrance end of the truncated hollow cone. The flow upwardly around the aerodynamic structure constitutes an annular flow, which adheres to the surface of the aerodynamic structure in the nature of a Coanda flow.

A spray nozzle 34 preferably extends above the top of the aerodynamic structure 30 through which is sprayed a suitable coating material. It is more convenient to have the spray nozzle located at the top of the centrally disposed aerodynamic structure. The coating material is supplied from a suitable source (not shown) through a conduit 36 extending up through the aerodynamic structure, and an atomizing gas may be supplied from a suitable source (not shown) through a conduit 38, also extending up through the aerodynamic structure, for subsequent mixing at the nozzle. The spray nozzle may also be pressure-operated rather than gas-operated.

The upper surface of the gas shaping or aerodynamic structure is centrally disposed within and extends generally horizontally across the cross-section of the vertically disposed hollow column. In other words, it has a cross-sectional plane generally perpendicular to the vertical axis of the vertically disposed hollow columns. The outer edge of the upper surface is equally spaced from the wall surface of the hollow column and defines therebetween with the wall surface of the hollow column a reduced pressure region for acceleration in velocity of the upwardly flowing gases in such manner that the upwardly flowing gases form a boundary layer that is directed away from the wall surface of the hollow column and that adheres to the upper surface of the gas shaping or aerodynamic structure for flow across a portion thereof.

The upper surface of the aerodynamic structure may be flat (not illustrated), but is preferably curved or approximately spherical as illustrated. It may have a height ($h_a$) above the cross-sectional plane (See FIG. 5), therefore, of from about 0% to about 150%, or preferably from about 10% to about 150% of the greatest cross-sectional diameter (D) (See FIG. 5) of the aerodynamic structure.

Figure 5:
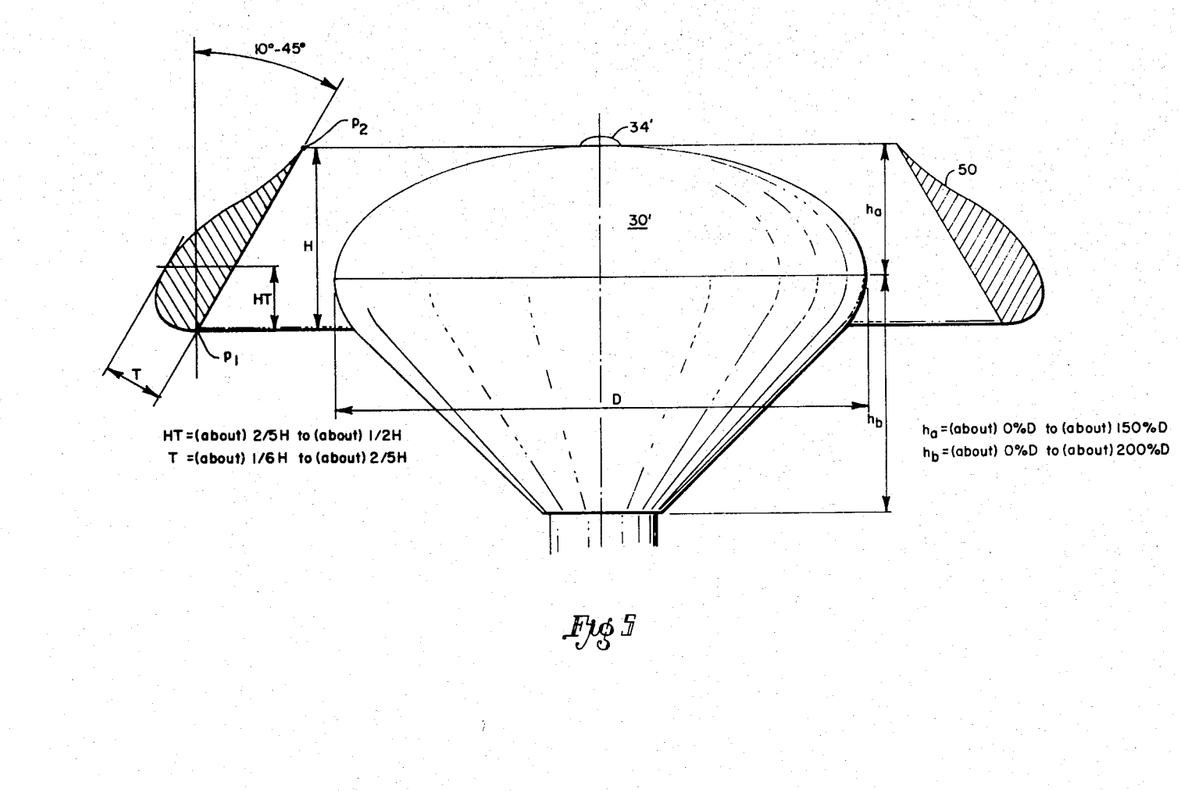
FIG. 5 is a graphic illustration of the height, thickness and angular relationships of the annular airfoil with respect to the aerodynamic structure, and the height above ($h_a$) and height below ($h_b$) relationships of the aerodynamic structure to the greatest cross-sectional diameter of the aerodynamic structure.

The surface below the greatest cross-sectional diameter may also be flat (not illustrated) and may therefore have a depth or height ($h_b$) below of from about 0% to about 200% of the greatest cross-sectional diameter (D) (See FIG. 5). Preferably, the surface below is formed in the manner disclosed in the drawings.

The aerodynamic structure as disclosed and as described is thus adapted to compress and accelerate the flowing gases near the periphery of the hollow column and direct them toward the center of the hollow column at an angle from about 10° to about 45° from a direction parallel to the flowing gases from the gas or air plenums.

The truncated hollow cone defines at its lower end a large diameter somewhat similar than the diameter of the vertically disposed first hollow column, and has an increased diameter from about 0% to about 25% greater than that of the plane of the particle support screen. The lower end of the truncated hollow cone is spaced a predetermined amount from the screen and the upper end defines a diameter of from about 20% to about 80% of that of the lower end. The height of the cone ranges from about one to about six times the diameter of the lower end.

In operation, seeds 40 may be suitably loaded into the coating apparatus 10, as through a closable opening at 42, into the storage zone lying between the wall surface of the first hollow column 12 and the outside wall surface of the truncated hollow cone 14. The seeds are thus situated in an annular bed around the truncated hollow cone 14. The sloping outer wall surface of the truncated hollow cone, the inwardly sloping tapered base 16 of the first hollow column and the screen 32 serve to contain the particles in the annular bed prior to starting-up the coating operation.

The gas or air is turned on to start the circulation of the seeds from the annular bed or storage zone into the coating, drying and deceleration zones and in return to the upper portion of the annular bed. The atmoizing spray is then turned on and appropriately adjusted in a suitable manner by controls (not shown).

Figure 1:
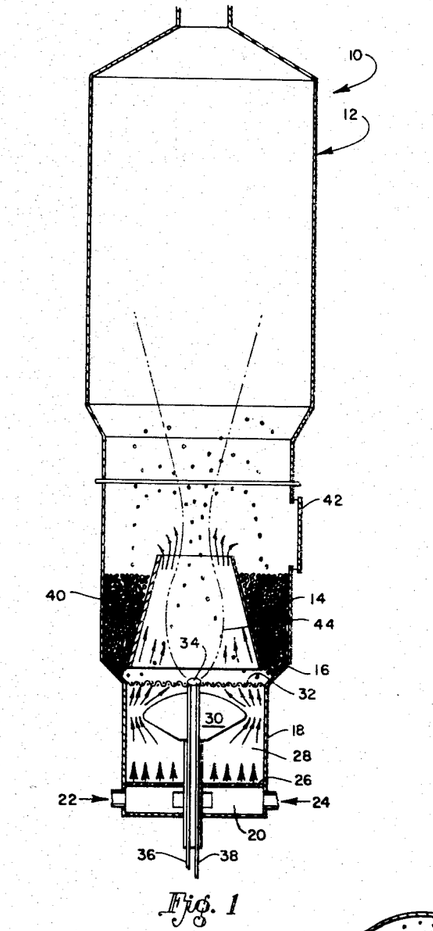
FIG. 1 is an elevation view in cross-section illustrating apparatus and showing gas flows and seed flow path from an annular bed through a truncated hollow cone and in return to the annular bed.

As previously pointed out, the Coanda flow or effect is named for the tendency of a fluid, either gaseous or liquid, to cling to a surface that is near an orifice from which the fluid emerges. Such "orifice" in this instance is formed in the region therebetween the closest approach of the aerodynamic structure to the adjacent side wall surface. The gas flow emerging from the "orifice" region around the aerodynamic structure is an annular flow which clings or adheres to the surface of the aerodynamic structure. The flow, therefore, from any one selected location around the "orifice" is opposed by the other flows so that it is prevented from continuing further over the upper surface of the aerodynamic structure by being forced upwardly away from the upper surface at some point for flow into the truncated hollow cone. A partial vacuum is formed in the region just above the upper surface of the aerodynamic structure and at the lower edge of the truncated hollow cone and this aids in the compression and focusing of the rising annular flow of gases. The upward flow is consequently caused to have a conical shape, as seen in phantom lines in FIG. 1 at 44 within the cone, and has a centering effect on the particle impelled upwardly through the cone.

As also pointed out, an important part of the Coanda effect is the tendency of the flow or gas or liquid to entrain, or draw in, more gas or liquid from the surrounding environment. In this latter manner, the particles are pulled from the annular bed or storage zone into the upwardly flowing gas due to the aforementioned partial vacuum or reduced pressure region that exists just above the screen adjacent the path of upward flow as a consequence of this Coanda effect. This reduced pressure or partial vacuum is directed perpendicular to the annular airflow from the "orifice". It is a different effect, however, from the horizontal shunting action occurring in the Wurster et al apparatus described above because there the horizontal shunting would extend not only toward the axis of the apparatus but also inefficiently toward the outer wall surface of the coating apparatus.

Once the seeds are pulled into the upwardly flowing gas within the truncated hollow cone, they are impelled upwardly in an accelerating gas or air stream. As the seeds pass through the lower central region or coating zone within the cone, they are contacted with an atomized spray coating of material. This atomized spray emerges from the spray nozzle 34 because the liquid coating substance is either forced through a single orifice designed to convert bulk liquids into droplets, or the liquid and an atomizing air stream emerge simultaneously from jets adjacent to each other. In either case, the fine droplets of coating material are in a flowable state, because the material is dissolved or melted in the region immediately above the spray nozzle.

Further up the truncated hollow cone, the liquid nature of the coating material, as deposited on the seeds, changes to solid by evaporative or other solidification processes. During the transition from liquid to solid, the seeds pass through a stage when they are sticky or tacky and would agglomerate if they contacted each other. This contact is prevented by the slope or pitch of the walls of the truncated hollow cone and consequent accelerating boost of the seeds to separate them in the manner previously discussed.

The conical nature of the cone causes a compression and acceleration of the rising column of gases and the upward velocity or acceleration of the particles occurs at an increasing rate as they rise in the cone. This acceleration causes an increasing vertical separation in space between the seeds and therefore reduces the tendency for the particles to contact each other until the coating has become nontacky. It is this region of the cone that is thus called the "drying zone".

When the compressed gases and entrained seeds pass upwardly out of the upper end of the cone, they expand into the larger area of the upper portion of the first hollow column and thus decelerate to a velocity too low to suspend the seeds. This is the deceleration zone, where further drying takes place, and the seeds then fall by gravity action to the annular bed where they gradually move down, also due to gravity, until they are pulled into the coating zone again. This recycling or recirculation continues until, based on previous experiments, a sufficient coating has been applied.

The atomized spray is turned off, and the gas or air entraining flow may be shut down or may be increased to drive the coated seeds into the uppermost region of the first hollow column, as for collection in the manner illustrated in FIG. 4. Any other suitable manner of unloading the finally coated particles may also be used.

A coating apparatus having the design characteristics essentially as shown in FIG. 1, and having a diameter of eight (8) inches across the lower end and four (4) inches across the upper end of the truncated hollow cone, is charged with twenty-five (25) pounds of cotton seeds. About 250 standard cubic feed per minute of air at about 7 p.s.i.g. is admitted to the plenum chamber 20. This air causes a circulation of pellets through the truncated hollow cone 14, and the height of the cone above the support screen 32 is adjusted to obtain a pellet flow rate such that all the pellets in the annular storage zone move through the cone about once every minute. A coating latex is pumped through the sprya nozzle 34 at the same time as 5 SCFM of atomizing air at 40 p.s.i.g. is supplied to the nozzle. The pumping rate is adjusted to pump one (1) pound of solution per minute. The apparatus is operated for about 45 minutes. The product is a pellet core coated with about a 2-mil layer of the polymer.

If the gases flowing upwardly around the aerodynamic structure could be seen as a series of layers of molecules, merely for sake of discussion, it is thought that there is an insignificant flow of molecules or layer or so of molecules along the interior wall surface of the second hollow column. By "insignificant" is meant that such layer or layers of molecules will not perform any supporting function of the particles in the annular bed.

Moving, therefore, radially inwardly from the interior wall surface of the second hollow, the more significant layers of molecules are caused to bend toward the gas shaping or aerodynamic structure, the innermost adhering to the surface of that structure as they pass upwardly through the "orifice" region. This adherence of the molecules to the surface of the aerodynamic structure may be favorably compared to the "teapot effect", which is a low-speed form of the "Coanda effect". When water is poured slowly from a glass, it tends to stick to the side of the glass in the same way that tea sticks to the spout of a teapot. High speed fluids behave similarly and adhere to a surface of suitable shape.

As the rising molecules flow over the surface of the aerodynamic structure after having passed the "orifice" region, previously mentioned, at some point along the upper surface of the aerodynamic structure the opposing character of the annular flow forces the molecules upwardly away from the upper surface as well as the adjacent molecule layers. A partial vacuum is created above the aerodynamic structure due to the high speed upward flow of gases, causing an inward bending of the upwardly moving molecules.

In the apparatus herein described, the seeds move down in the annular bed by gravity without any "dancing" occurring, and are drawn into the upwardly flowing gases by the partial vacuum. Thus, any attrition that might occur is greatly minimized, and the overall operation is much more efficient.

In reference to FIG. 2 in which a modification is disclosed, the same reference numbers will be used to identify similar elements previously described, except that they will be primed to show that it is a different embodiment under discussion.

FIG. 2 represents an embodiment wherein the size of the coating apparatus 10' has been increased in order to handle larger batch loads of seeds for coating treatment. It has been found that it is more practical to add an additional gas shaping or aerodynamic structure or an annular airfoil 50 instead of increasing the size of the aerodynamic structure 30'. In this manner, larger amounts of upwardly flowing gas or air may be supplied undiminished or unobstructed by a larger aerodynamic structure, and the annular airfoil serves to supplement the compression and focusing action on the upward gas flows so that substantially all gas flows move through the truncated hollow cone 14'.

Additional or multiple gas shaping or annular airfoils (not shown) also may be used for still larger coating apparatus. The exact shape and placement of the airfoils are functions of a number of variables. The most significant of the variables are size of the apparatus, size of the seeds to be coated, density of the seeds, rate of gas or air flow and the rate of recirculation of the seeds through the coating zone desired.

In a larger-scale coating apparatus, therefore, one or more annularly shaped and placed gas shaping or aerodynamic structures or airfoils, angled or curved, may be provided concentric with and radially outwardly of the central gas shaping or aerodynamic structure. The annular airfoils may be attached to the central aerodynamic structure or to the walls of the coating apparatus by radial struts in such manner as to exert a minimum deflection of the upwardly flowing gases.

The annular aerodynamic structure is inwardly inclined in the upward direction so that its inclination lies in a plane extending about 10° to about 45°, as measured from the axis perpendicular to the diameter of the coating apparatus. The inwardly inclined annular structure provides a surface on which the gas or air impinges for subsequent shaping and direction upwardly into the truncated hollow cone.

The vertical height of the annular structure may be about 10–50% of the perpendicular cross section diameter of the coating apparatus.

In the reference to FIG. 5, when the annular gas shaping structure has the configuration of an airfoil having at least one curved surface extending generally in the direction of gas flow, the overall angle of a line described from a point $p_1$, on the lower rim of the airfoil to a point $p_2$, on the upper rim in the vertical direction, or perpendicular to a line which is tangent to the upper curved surface of the centrally disposed aerodynamic structure, is from about 10° to about 45° inward facing, as measured from the axis perpendicular to the diameter of the coating apparatus.

The cross-sectional configuration of an annular airfoil in a plane described from the center of the crosssectional area of the coating apparatus to a point, $p_1$, on the lower rim of the airfoil to a point, $p_2$, in the upper rim of the airfoil is teardrop, or similar to the crosssectional shape of a lifting aerodynamic shape, and having the thicker cross section on the forward part with reference to the direction facing the upwardly flowing gases. The thickest part is located about two-fifths (2/5) to about one-half (½) of the height in the vertical direction. In other words, the height (H) of the thickest part (T), or HT is equal to about 2/5 H to about ½ H. The thickest cross section (T) is from about one-sixth (1/6) to about two-fifths (2/5) of the height (H) of the airfoil; or T is equal to about 1/6 H to about 2/5 H.

The size, placement and geometrical configuration of the annular gas shaping structure are such, therefore, that the upwardly flowing gases are deflected radially inwardly at an angle from about 10° to about 45° from a direction parallel to the original gas flow.

Figure 3:
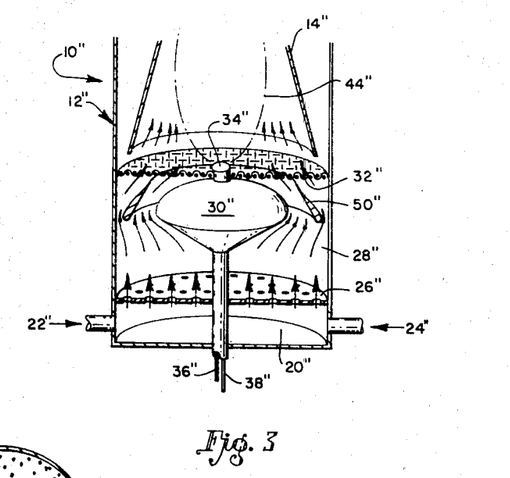
FIG. 3 is a partial elevation view in cross-section of another modified apparatus similar in all other respects to the modification shown in FIG. 2 except that the cross-section of the apparatus below the coating chamber is of the same diameter as that of the coating chamber.
Figure 4:
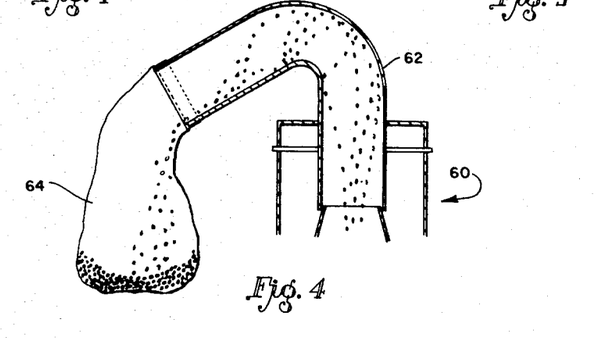
FIG. 4 is partial elevation view in cross-section of the upper portion of the apparatus, illustrating one possible manner of collecting the seeds by use of an air porous bag.

In reference to FIG. 3, the same reference numbers will be used to identify similar elements previously described, except that they will be double-primed to show that it is still another different embodiment under discussion.

Figure 2:
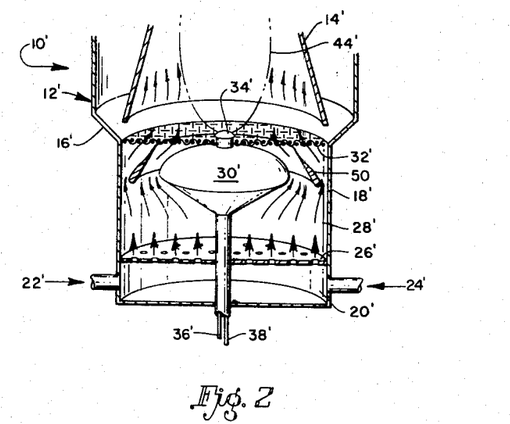
FIG. 2 is a partial elevation view in cross-section of a modified apparatus and illustrating the addition of an annular airfoil and showing the flow of gases relative to the aerodynamic structure and annular airfoil.

FIG. 3 represents an embodiment wherein the size of the coating apparatus 10" has been increased to the same extent as that disclosed in the FIG. 2 embodiment. The embodiment in FIG. 3 differs from the embodiment in FIG. 2 in that the first and second hollow columns are disclosed as being co-extensive in cross-sectional diameter. In other words, the coating apparatus is disposed within a single hollow column. It could also be of smaller size so that only one gas shaping or aerodynamic structure 30" is employed as in FIG. 1, instead of a size requiring the annular airfoil 50".

The recycling or recirculation in this embodiment is necessarily faster because the seeds are not as readily restrained in the annular bed region as they would be if there were an inwardly tapered base to assist in such restraint. Proportionately smaller batch loads may be used, therefore, since the recirculation of the seeds is substantially continuous with the particles spending very little time in the annular bed. For this reason, an embodiment of this character is suitable for special purposes, while the embodiments of FIG. 1 and FIG. 2 are deemed to be of more general use.

In FIG. 4 this embodiment represents one manner of unloading a coating apparatus, and was briefly mentioned above with respect to one possible operation of the embodiment of FIG. 1.

Only the upper portion of a coating apparatus 60 is shown, and it could be used for any of the previously described embodiments. A conduit 62 is installed within the upper portion of the apparatus, as shown, and a gas or air porous collection bag 64 may be installed at the remote end of the conduit for collecting the finally coated seeds in the manner already heretofore described.

In any of the embodiments described above, the truncated hollow cones may be adapted to be adjusted for movement upwardly or downwardly in a vertical plane. The same may also be accomplished with the aerodynamic structure, the annular airfoils and the spray nozzles, as desired to suit gas or air flows, seed sizes and weights, coating material consistencies and whatever other controlling factors may be concerned.

The seeds to be coated may be batch-loaded and treated; or, if deemed advantageous, two or more such coating apparatus may be arranged in cascaded manner to provide for a continuous coating operation. The inlet for the seeds in a cascaded arrangement may be disposed above the annular storage of one apparatus and the particles metered in predetermined manner into the annular storage bed, while the outlet to the next coating apparatus may be disposed on the opposite side of the annular storage bed and constitute a weir for outflow of excess coated particles. The inlet may also be disposed for gravity flow of seeds to or into the annular storage bed. It may be desirable to provide for different coatings in different apparatus, or provide supplemental coatings.

Multiple spray nozzles may also be employed, as desired, to achieve different coating effects.

The following examples are submitted for a better undrstanding of the invention.

EXAMPLE 1

A polymeric microgel is formed by high shear stirring the following mixture at 60° C.:

70 g acrylic acid
20 g styrene
10 g divinylbenzene
1000 g water
2 g Dupanol ME (sodium lauryl sulphate)
1 g Emulphor ON-870 (polyethylene oxide surfactant manufactured by GAF)
2 g potassium persulfate The crosslinked polymeric dispersion obtained may be used as prepared or alternatively it may be dried by any of a variety of techniques. In this example, the polymer dispersion is evaporated to dryness and is then resuspended in acetone. Soybean seeds are coated by spraying the acetone containing 5–25% solids onto the surface of the soybeans. A continuous layer 0.001-inch thick of the polymer is obtained.

For the purposes of comparison, another lot of soybean seeds are coated with polyacrylic acid (0.5 intrinsic viscosity) dissolved in acetone. The seeds having both coatings are placed in test tubes on top of water-moistened plugs of cotton.

The seeds coated with the crosslinked polymeric microgel are observed to start water imbibition within five minutes. Within 10 minutes, the polymeric layer has formed numerous cracks due to swelling stresses imposed on the crosslinked structure. Within 30 minutes, the seed is observed to be swelling. The germination of the soybeans proceeds uninhibited by the crosslinked microgel.

The soybeans coated with the uncrosslinked polyacrylic acid show the first evidence of swelling only after about one hour and the polymeric film is still intact and remains intact until the radical of the seed thrusts the coating aside.

After five days, the seeds coated with the crosslinked microgel are fully germinated and about six inches tall whereas the seeds coated with the soluble polymer are only partially germinated and less than three inches tall.

EXAMPLE 2

The microgel composition described in Example 1 is suspended in acetone and, based on the weight of microgel, 0.05% of Captan 50% wettable powder fungicide is added. This mixture is used to coat soybean seeds which are contaminated with fungi in the dormant spore state. The seeds are germinated and are compared to untreated seeds. The coated seeds show no evidence of fungal growth whereas the uncoated seeds show some evidence of contamination on every seed. About 50% of the uncoated seeds show reduced degrees of germination due to infection by the fungi.

EXAMPLE 3

The process described in Example 1 is used to make a microgel from 70 g methacrylic acid
20 g styrene
10 g divinylbenzene While still suspended as a latex in the polymerization mixture 30% of the carboxyl groups is neutralized with 10% ammonium-hydroxide solution.

EXAMPLE 4

A 50% portion of the microgel obtained in Example 3 is dried by evaporation of the water then, was resuspended in solvent composed of 30% water and 70% methanol having 10% microgel solids. This suspension is used to coat soybean seeds with a layer 3 mils thick. When the coated seeds are planted and compared to uncoated seeds similarly planted it is found that the rate of germination is essentially the same for both lots of seeds. After about 10 days, however, the coated seeds show an acceleration of growth due to the slow release of ammonia. Whereas for many crops the amount of ammonia provided by the described amount is insignificant, the soybean benefits because nitrogen fertilizer is not generally used since the plant is leguminous. The quantity of ammonia described is important to the new seedling before modulation of the legumious plant by nitrogen fixing bateria.

EXAMPLE 5

The second portion of the microgel obtained in Example 3 is admixed with 50 g. Captan 7% wettable powder. Next 100 g of methanol is added. This mixture is sprayed on 5000 g of sorghum seeds by the technique described in Example 1 until the seeds have 4% coating based on the seed weight. The seeds all germinate in soil infested by fungi and maintained at 21° C. Under these conditions the disease fungi are more favored than the seed but the seeds germinate in about 10 days whereas control seeds are essentially destroyed by fungi in the same period.

EXAMPLE 6

A microgel is made by first polymerizing vinyl acetate in the following process. The following mixture is stirred at 60° C. under a nitrogen blanket.

100 g vinyl acetate
2 g ethylene diacrylate
2 g sodium lauryl sulfate
1000 g water
1 g potassium persulfate
0.5 g sodium metabisulfate After 4 hours a cross-linked latex of polyvinyl acetate is obtained. This latex is heated to the boil and 30 g sodium hydroxide is slowly added as a 40% solution in water. After 10 hours the result is a water swollen microgel of cross-linked polyvinyl alcohol partially precipitated by the presence of the sodium acetate obtained as a by-product. The solution is cooled and the microgel separated as a sludge from which the salt solution can be decanted. If further purification is required the volume of the sludge can be reduced by addition of methanol equal to 50% of the total volume, then the liquid can be decanted to provide essentially pure microgel. The microgel sludge is resuspended by adding at least 300 g water. If diluted with 500 g water it consists of about 33% suspension of microgel in water and useful as a seed coating to be applied by air suspension coating or by tumbler methods similar to tablet coating as is practiced in the pharmaceutical industry. The advantage of the seed coated with this formulation is to protect the seed from pathogen attack by sealing the seed from invasion by fungi spores or baterial pathogens during seed storage. This coating also functions as a soil conditioner after falling off during germination of the coated seed.

EXAMPLE 7

The microgel described in Example 6 as a 33% solids suspension in water is compounded with 0.1% hydroquinone based on the dry solids of microgel. This mixture is then coated on the coated seeds obtained in Example 6 to give a coated seed with two layers. These two layers serve to restrict the permeation of oxygen through the coating due to the low permeation rate of oxygen through polyvinyl alcohol. The traces of oxygen which do penetrate the polymer are reduced by the hydroquinone. Now the seed is protected from invasion by pathogens and protected against oxidative degradation during the storage period.

EXAMPLE 8

A microgel is made by the following process. First, 100 g of 2-methyl-5-vinylpyridine, 2.5 g dimethylbenzene, 900 g of water, 4 g of sodium stearate are stirred at 60° C. under a nitrogen blanket. Next, 1.5 g potassium persulfate is added and stirring is continued until polymerization of the monomers is complete, usually about 4 hours. The resulting polymer is obtained as a latex comprised of cross-linked spherical particles having an average diameter of about 1.0 microns. Next the water is removed by coagulating the latex, filtering and drying or by spray drying or other methods well known to the art of polymer technology. The product obtained is a dry powder of cross-linked polymer which, although is insoluble, can be suspended in organic liquids capable of either extensive swelling or dissolving linear uncrosslinked poly-2-methyl-5-vinylpyridine. In this example the polymer is suspended in methanol to obtain a liquid containing 10% solids. Next, based on the total titratable basic amine functionality a stiochimetric quantity of dilute nitric acid is added. Soybean seeds are coated with this suspension of nitrate salt of microgel to form continuous layers of about 1 mil on each seed using an air suspension coater. The seeds are germinated in soil at a temperature of 21° C. These conditions provide both water stress and temperature stress for soybean seeds. However, since the coating is hydroscopic, sufficient water is collected and held on the surface of the seed to enable germination. In addition the nitrate ion is a nutrient for plants and a promotor of early germination.

EXAMPLE 9

Soybean seeds are coated in an air suspension coater with a layer of Ethacel (cellulose ethel ether) from a solution in methanol. A layer about 0.25 mil thick is developed on each seed. Next the seeds are coated with the microgel described in Example 8 in the same manner as described. These seeds are protected from a slight burning on seedlings of Example 8 by the barrier properties of the inner Ethocel layer.

EXAMPLE 10

Soybean seeds are coated in an air suspension coater with an acetone solution containing 5% by weight of polymethyl methacrylate and 12% by weight of finely divided calcium carbonate. This coating is deposited in a continuous layer about 0.75 mils thick and comprises a microporous structure permeable to gases and water. Next a 3 mil layer of the microgel described in Example 9 is applied by the air suspension coater. Over the microgel layer is applied yet another 0.75 mil layer of the polymethyl methacrylate containing calcium carbonate. The final coated seed now is covered with three layers. The function of the outermost layer is to adjust the planted pH providing a slight basic pH to the soil environment and acting as a deterrent to fungal attack of the seed. The second layer provides the nitrate ion for promoting early germination of the seed and early nutrition of the seedling plant. The innermost layer is a buffer or barrier preventing direct contact of the nitrate of the microgel layer with the seed surface. When the seeds are planted germination is rapid and seedling growth is accelerated. This multilayered coating is particularly beneficial to seeds which have deteriorated due to age. A lot of seeds over a year old and having germination rate of less than 50% emergence in typical soil are compared to the same seed having the described multilayer coating. The coated seeds germinate at the rate of 69% and the seedlings have improved vigor.

Unless otherwise specified, all parts, percentages, ratios, etc., are by weight.

The invention has been described in detail with particular reference to certain preferred embodiments thereof, but it will be understood that variations and modifications can be effected within the spirit and scope of the invention.

I claim:

1. A plant seed having a substantially continuous coating on the surface thereof, said coating comprising polymeric microgel particles, the binding forces at the interface between particles of the coating having a greater sensitivity to water than the binding forces which maintain the particles intact, whereby contact with water destroys the continuity of the coating by releasing the binding forces between adjacent microgel particles.

2. A plant seed according to claim 1 selected from the group consisting of vegetable, crop and flower seeds.

3. A plant seed according to claim 2 wherein the seed is a grain seed.

4. A plant seed according to claim 2 wherein the seed is a soybean seed.

5. A plant seed having a substantially continuous coating on the surface thereof, said coating comprising water insoluble but water swellable crosslinked polymeric colloidal particles, the binding forces at the interface between particles of the coating having a greater sensitivity to water than the binding forces which maintain the particles intact, whereby contact with water destroys the continuity of the coating by releasing the binding forces between adjacent particles.

6. A plant seed according to claim 5 wherein said particles have an average diameter of from about 0.01 micron to about 3 microns.

7. A plant seed according to claim 1 wherein said microgel is derived from at least one monomer selected from the group consisting of acrylic acid; methacrylic acid; hydroxy esters, amino substituted esters and amides of acrylic acid, methacrylic acid, and maleic acid; vinylpyridine and derivatives of vinylpyridine.

8. A plant seed according to claim 1 wherein said microgel has a swellability of from about 300 to about 500%.

9. A plant seed according to claim 1 wherein said coating contains at least one substance selected from the group consisting of fungicides, bactericides, herbicides, pesticides, fertilizers, growth promoters and hormones.

10. The method of promoting healthy growth of plant seeds which comprises applying to the seeds a coating comprising polymeric microgel particles, the binding forces at the interface between particles of the coating having a greater sensitivity to water than the binding forces which maintain the particles intact, whereby contact with water destroys the continuity of the coating by releasing the binding forces between adjacent microgel particles.

11. The method of promoting healthy growth of plant seeds which comprises applying to the seeds a coating of water insoluble but water swellable crosslinked polymeric particles, the binding forces at the interface between particles of the coating having a greater sensitivity to water than the binding forces which maintain the particles intact, whereby contact with water destroys the continuity of the coating by releasing the binding forces between adjacent particles.

12. The method of claim 11 wherein said coating is from about 0.5 to about 10 mils in thickness.

13. The method of claim 12 wherein said coating comprises a substance beneficial to said seeds.

* * * * *